March 20, 1951
E. C. MANDERFELD
FIRE SHUTTER AND DOUSER FOR
MOTION-PICTURE PROJECTORS
2,545,738
Filed July 14, 1949
3 Sheets-Sheet 1
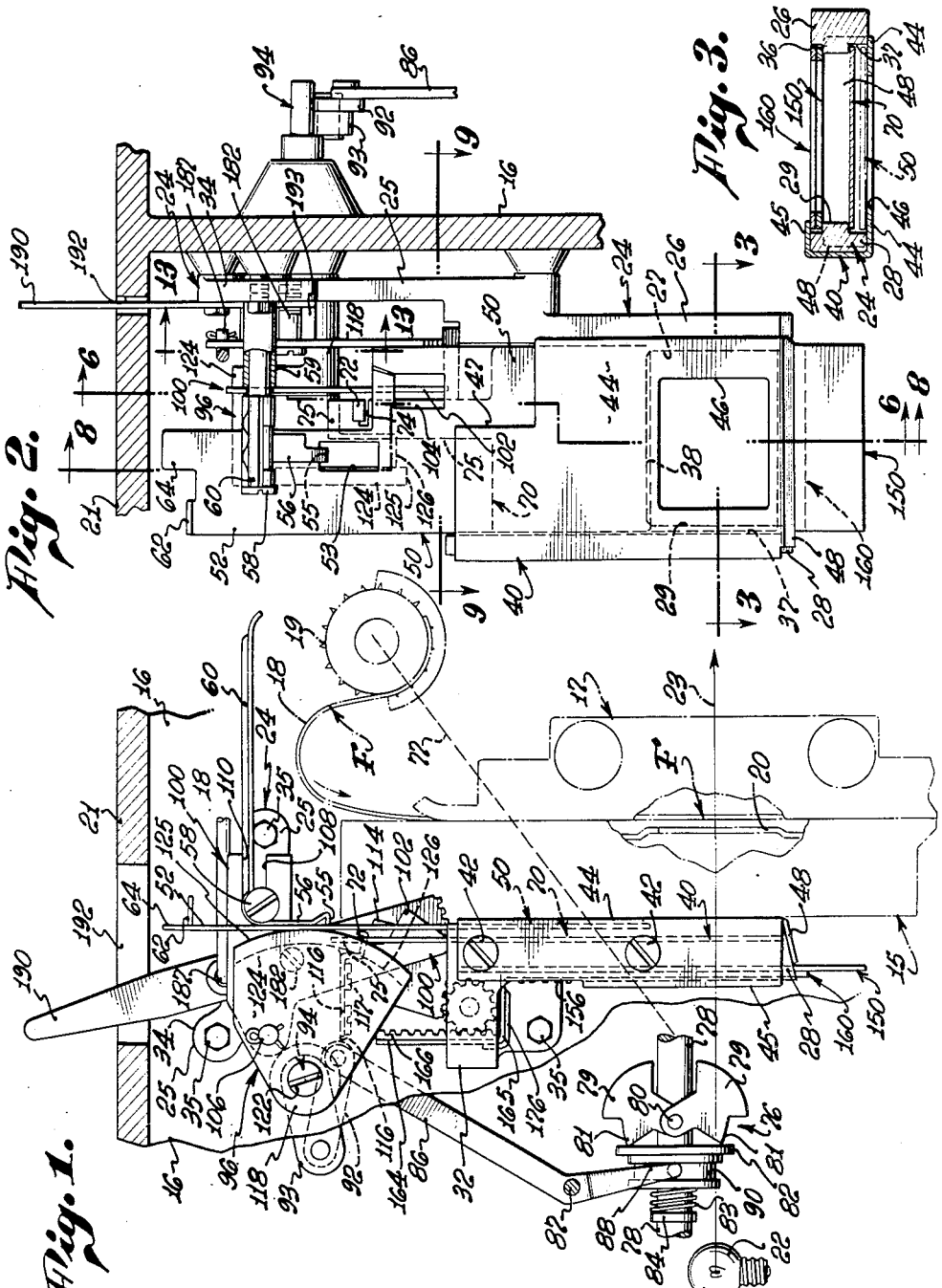
INVENTOR.
EMANUEL C. MANDERFELD,
BY
ATTORNEYS.

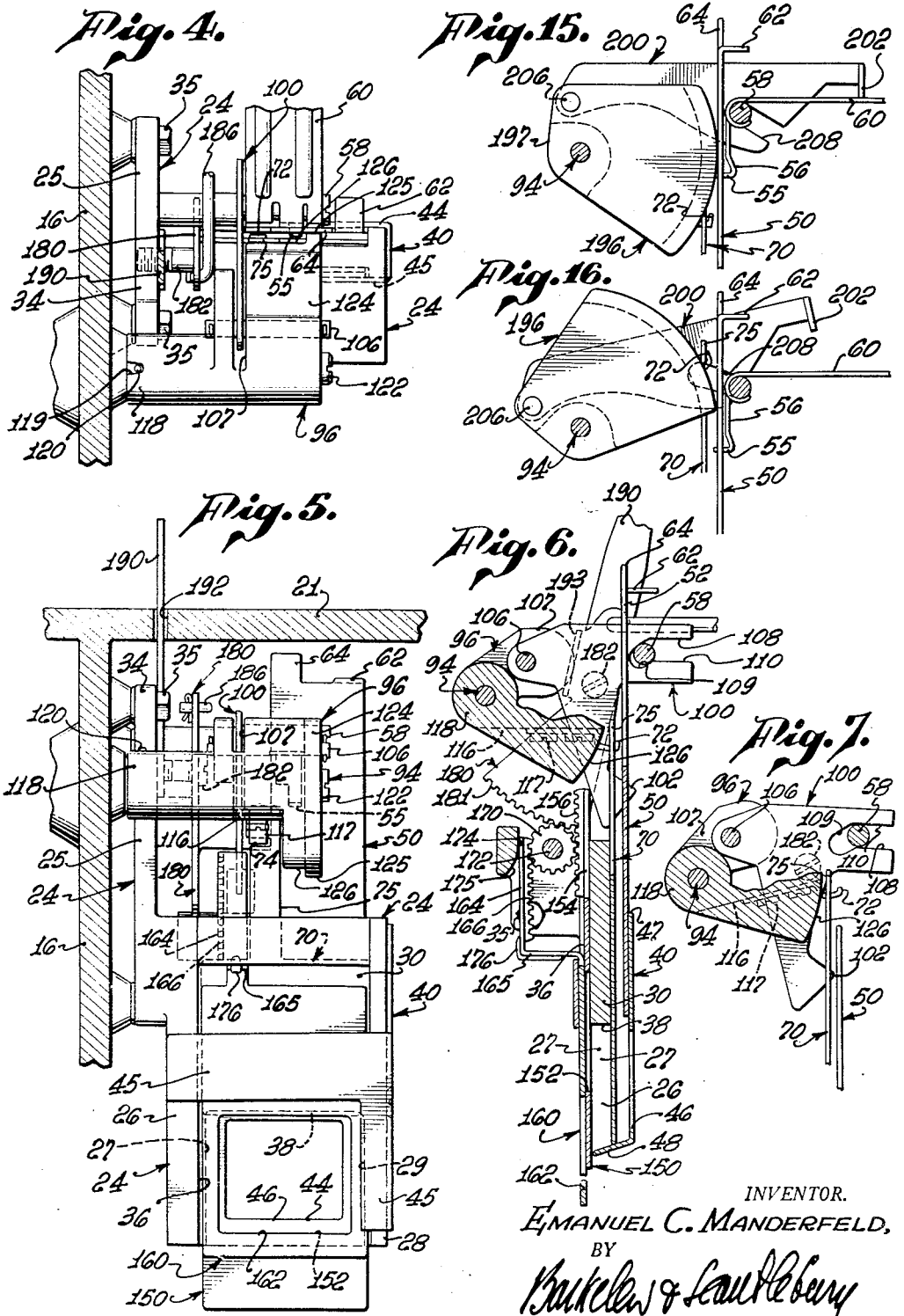

March 20, 1951 — E. C. MANDERFELD — 2,545,738
FIRE SHUTTER AND DOUSER FOR MOTION-PICTURE PROJECTORS
Filed July 14, 1949 — 3 Sheets-Sheet 3
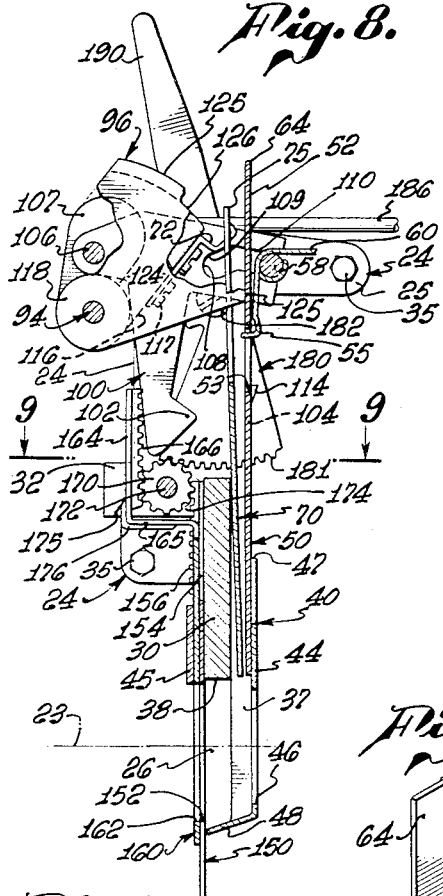
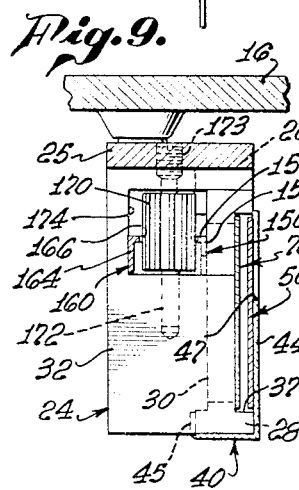
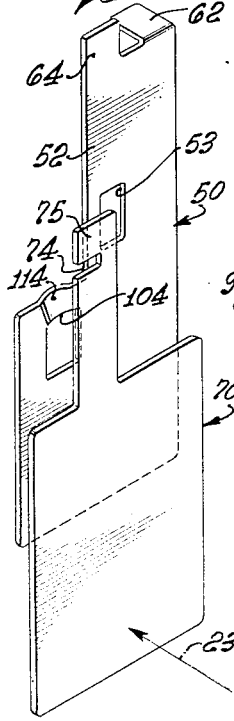
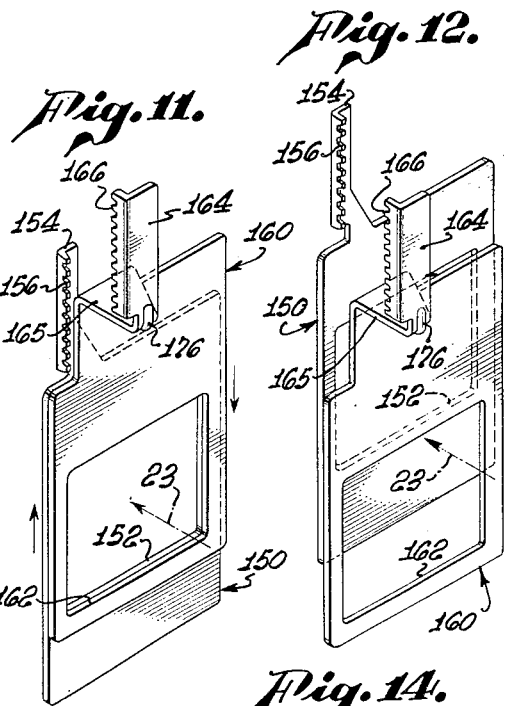
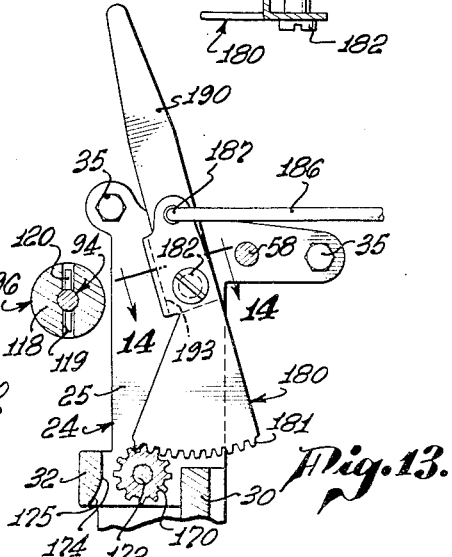
INVENTOR.
EMANUEL C. MANDERFELD,
BY
Beukelew & Saukebury
ATTORNEYS.

Patented Mar. 20, 1951

2,545,738

UNITED STATES PATENT OFFICE 2,545,738

FIRE SHUTTER AND DOUSER FOR MOTION-PICTURE PROJECTORS

Emanuel C. Manderfeld, Los Angeles, Calif., assignor to Mitchell Camera Corporation, Glendale, Calif., a corporation of Delaware Application July 14, 1949, Serial No. 104,658

9 Claims. (Cl. 88—17)

This invention is concerned generally with improved supporting and actuating mechanism for shutters for controlling the projection light beam of a motion picture projector. The invention has to do more particularly with fire shutter means for interrupting the light beam at a point between the light source and the motion picture film to avoid overheating the film under certain abnormal conditions of operation; and with dowser shutter means for commencing and interrupting projection under normal operation at the beginning and end, respectively, of projection of a reel of film.

The fire shutter mechanism of the invention is of the general type that employs two separately operable fire shutters, one of which is typically automatically actuated in response to variations in the speed of the film moving mechanism, and the other of which is controlled in its action primarily in response to the condition of the film itself. For convenience of reference, the former shutter will be referred to as the speed shutter, and the latter as the film shutter. An important object of the invention is to avoid the inconvenience that results in previous mechanisms of that type from the fact that the film shutter is likely to be tripped, so that it closes, during the operation of threading film in the film moving mechanism of the projector. Such closing of the film shutter during threading is inconvenient, and is unnecessary since the film moving mechanism is then substantially at rest, and the speed shutter is therefore already closed.

The invention avoids unnecessary tripping of the film shutter during threading by providing an interconnection between the two shutters or their control mechanisms by which upon closure of the speed shutter the film shutter is automatically locked in open position against film actuation. Upon reopening of the speed shutter, the film shutter is returned to its normal control by the film.

A further object of the invention is to provide a locking mechanism of the type described which operates positively and rapidly, which requires only moderate accuracy of its parts, and which is economical to produce and reliable in operation.

The invention further provides a remarkably compact and convenient structure which includes both the fire shutter mechanism referred to above and a projection-controlling dowser shutter of improved type.

Other objects and advantages of the invention will be understood from the following detailed description of a preferred embodiment of the invention, and a typical modification, which, however, are intended as illustrations and are not to be construed as limiting the scope of the invention. The appended drawings, which form a part of that description, are as follows:

Fig. 1 is an elevation of a preferred embodiment of the invention, in a plane parallel to the optical axis of the projection system, showing the dowser shutter and the film shutter open and the speed shutter closed;

Fig. 2 is an elevation in a plane transverse of the optical axis looking toward the rear of the projector;

Fig. 3 is a horizontal section on line 3—3 of Fig. 2;

Fig. 4 is a plan;

Fig. 5 is an elevation in opposite aspect to that of Fig. 2;

Fig. 6 is a vertical section on line 6—6 of Fig. 2, showing the dowser shutter closed;

Fig. 7 is a fragmentary section similar to Fig. 6, but showing a position of the mechanism as the speed shutter starts to open;

Fig. 8 is a section generally on line 8—8 of Fig. 2, showing the dowser shutter and the speed shutter open;

Fig. 9 is a horizontal section on lines 9—9 of Figs. 2 and 8;

Fig. 10 is a schematic perspective, looking from the rear (Fig. 5), of the two fire shutters in their normal mutual relation when the film shutter is open and the speed shutter is closed;

Figs. 11 and 12 are schematic perspectives in the same aspect as Fig. 10, showing the two dowser shutter blades in open and closed position, respectively;

Fig. 13 is a fragmentary section on line 13—13 of Fig. 2;

Fig. 14 is a fragmentary section on line 14—14 of Fig. 13; and

Figs. 15 and 16 are fragmentary sections similar to Fig. 6, illustrating a modification with speed shutter closed and open, respectively.

In the drawings only so much is shown of the motion picture projection machine proper as to render fully understandable the construction and operation of the present invention. The film trap of the projection machine is represented in broken lies at 15 in Fig. 1, and is ordinarily rigidly but releasably mounted on the main frame of the machine, for example on wall 16 (Fig. 2). The film gate 17 is movable, by means not shown, with respect to film trap 15 to facilitate threading a film F through the film moving mechanism (here represented for clarity by the single sprocket 19) and between gate 17 and trap 15 past the film aperture 20, indicated as a part of the trap. Between sprocket 19 and gate 17 the film forms a free loop 18 in the usual manner, that loop having a normal average size approximately as shown in Fig 1.

Light from a light source indicated at 22 is directed by optical means, not shown, along the optical axis 23 and through film aperture 20 to illuminate the film F at the aperture. The fire and dowser shutters, with which the present invention is primarily concerned, are insertible, under controls to be described, across the optical axis 23 between light source 22 and film aperture 20.

In the embodiment of the invention here illustratively described, both the fire shutter mechanism and the dowser mechanism are mounted primarily upon the same compact and simple supporting structure. The principal elements of that structure are the supporting frame 24 and the sheet metal cover piece 40. Frame 24 is preferably formed as a unitary casting, and comprises a generally flat mounting plate 25 by which the entire assembly is mounted on the vertical wall 16 of the main frame of the projector; inner and outer vertical legs 26 and 28 respectively, the upper portions of which are connected by vertical web 30; a horizontal rearwardly projecting flange 32 at the upper edge of web 30; and a boss 34 near the upper end of mounting plate 25. Boss 34 provides pivot supports for certain elements of the operating mechanism, as will be described. Frame 24 is secured to the main frame of the projection machine by three bolts, indicated at 35, which are threaded into bosses on wall 16 of the projector case.

Frame legs 26 and 28 are of T-section, as shown best in Fig. 3; with opposed webs 27 and 29. Those webs are of the same thickness as web 30, of which they may be considered to be extensions. Thus two vertical channels or guideways are formed between legs 26 and 28 and separated from each other by webs 27, 29 and 30. A light aperture is formed between legs 26 and 28 and below the lower edge 38 of web 30. In rear guideway 36 the two shutter blades 150 and 160 of the dowser slide freely, while in the forward guideway 37, which is somewhat deeper than 36, the two fire shutter blades 50 and 70 are received with ample clearance (see Fig. 3, in which the position of open shutter blade 50 is indicated by dot-dash lines). The four shutter blades are retained in their two guideways by cover piece 40, which extends across the outer face of leg 28, to which it is secured as by screws 42, and is folded back around that leg and leg 26 to form front and rear cover plates 44 and 45. Front cover plate 44 of cover piece 40 is provided with an aperture bounded by the edge 46, for the projection light beam, registering with the frame aperture, and has its upper inner corner cut away as shown at 47 in Figs. 2, 8 and 9. Rear cover plate 45 is also provided with an aperture registering with the aperture of the frame. As illustrated, the lower portion of rear cover plate 45 extends inwardly only just beyond leg 28 in order to clear the light beam, but its upper portion extends inwardly above the light beam all the way across channel 36 to inner leg 26 (Fig. 5). Front cover plate 44 carries along its lower edge a lip 48 which is bent back across the lower ends of legs 26 and 28 and forms a lower stop for fire shutter blades 50 and 70 in their guideway 37. However, lip 48 leaves rear guideway 36 open at the bottom so that dowser blades 150 and 160 can extend below frame 24 as shown for example in Fig. 1.

Each of the fire shutter blades 50 and 70 has a solid lower part adapted to close completely aperture 46 in cover piece 40 when the shutter is near the lower end of its travel in guideway 37, thereby shielding film aperture 20 from light and heat from light source 22. The fire shutters are opened by upward translational motion of their respective shutter blades in the guideway, and only if both shutters (and also the dowser shutter) are open is light admitted to aperture 20 for projection of the film image. As illustrated, both shutter blades 50 and 70 are continuously urged toward closed position by the force of gravity. Additional resilient or other means may be provided if desired, such, for example, as independent coil springs exerting a downward force on the respective blades. Such means are provided in the case of shutter 70 (see below). In the present description and claims reference to means for closing a shutter, for example, is intended to include either a separate means such as a spring or auxiliary weight, or a property of the shutter blade itself, such as its own weight.

Forward fire shutter blade 50 has an upwardly extending stem 52 in which there is a rectangular aperture 53 adapted to receive the latch hook 55. That hook extends horizontally from a generally vertical latch arm 56 which is freely pivoted on a headed pivot stud 58, rigidly mounted on mounting plate 25 of frame 24. A tripping arm 60, also pivoted on stud 58 and preferably constructed integrally with latch arm 56, extends horizontally above film loop 18. The weight of tripping arm 60 tends to swing it and latch arm 56 clockwise as seen in Fig. 1 about stud 58, normally maintaining latch 55 in shutter supporting engagement with latch aperture 53, and thereby holding shutter 50 open. However, if the film F breaks at any point in the film gate, or if for any other reason the film ceases to be drawn through the gate while continuing to be fed toward the gate by sprocket 19, film loop 18 tends to become larger. That quickly brings the top of the film loop into contact with tripping arm 60, swinging it and latch arm 56 counter-clockwise around pivot stud 58. Latch 55 is thereby withdrawn from aperture 53, releasing the shutter, which, if not otherwise supported (see below), immediately drops from open position to closed position across optical axis 23, cutting off the projection light from film aperture 20.

When that occurs during operation of the projector the machine may be stopped by the operator (or automatically by a relay switch operated by the upward movement of arm 60, if desired), and the film rethreaded correctly in the film moving mechanism. Alternatively, the film position may sometimes be corrected without stopping the machine. In either case, tripping arm 60 is then no longer supported by film loop 18, and swings downward about pivot stud 58 until stopped by contact of the end of latch hook 55 with the front face of shutter 50 above aperture 53. If the shutter is then manually returned to open position, as soon as aperture 53 comes opposite latch hook 55 the latter enters it under the yielding force of the weight of tripping arm 60. The shutter is thus again held open until released by upward motion of tripping arm 60. Manual opening of shutter 50 is facilitated by a projecting finger tab 62, preferably formed as an integral part of the shutter by bending a portion of stem 52 forward at right angles to the plane of the shutter blade, as shown clearly in Figs. 1, 2 and 10. Tab 62 then performs the additional function of clearly indicating to the operator the position of shutter 50. The upper extremity 64 of shutter stem 52 is of such length that it contacts the roof 21 of the projector case when the shutter is raised just above its normal open position, thus acting as a stop for the shutter opening movement.

Speed shutter blade 70 hangs loosely behind film shutter blade 50 in guideway 37, supported and controlled by a hook 72 which engages a horizontal slot 74 in a stem portion 75 of the shutter blade. Shutter 70 is automatically manipulated via a suitable linkage from a speed responsive device associated with some element of the projector mechanism that rotates in timed relation to sprocket 19 and other elements of the film moving mechanism. Such a speed responsive device is shown illustratively at 76 (Fig. 1), mounted on a shaft 78, which is typically the shutter shaft of the projection machine. A driving connection between shaft 78 and sprocket 19 (representing the film moving mechanism in general) is indicated schematically in Fig. 1 by the line 77. The shutter shaft 78 of the projection machine rotates at a speed approximately proportional to the speed of the film moving mechanism. Although that proportionality is usually not exact, because of the action of the framing adjustment of the machine, the indicated arrangement is illustratively representative of a general speed relation between the film moving mechanism and the speed responsive means.

Centrifugal weights 79 are pivoted at 80 on shaft 78 on arms which include camming portions 81 adapted, upon centrifugal movement of the weights, to move a collar 82 axially of shaft 78 away from pivot 80. A spring 83 is preferably provided, acting between collar 82 and, for example, a flange 84 on the shaft, to oppose that axial movement of the collar. A lever 86 is pivoted on the projector frame, as indicated at 87. The lower end of lever 86 carries a yoke 88 which engages a circumferential groove 90 in collar 82, so that axial movement of the collar with increasing shaft speed results in swinging movement of lever 86 about its pivot 87 in a clockwise direction as seen in Fig. 1. The upper end of the lever is connected by means of a pivoted link 92 to a crank arm 93, rigidly mounted on a pivot shaft 94.

As illustrated, the governor shaft 78 and governor 76 are located behind wall 16 of the projector case, and pivot shaft 94 is journaled in that wall (not on frame 24) and transmits the controlling action of the governor through that wall to speed shutter 70. Other arrangements can, of course, be used, with suitable modification of the control linkage. In the preferred modification, crank arm 93 is mounted on the inner end of pivot shaft 94, and shutter supporting hook 72 is rigidly mounted on a crank arm on the outer end of the pivot shaft, the latter crank arm comprising a relatively heavy mass 96, fully described below. The construction of hook 72 permits relative pivoting action of the hook and shutter blade 70, combined with a limited radial motion of the shutter blade with respect to mass 96. Other types of connection may be substituted if preferred, but the form illustrated is remarkably simple and reliable and has the further advantage of permitting very rapid and convenient disassembly.

When shaft 78 is at rest, as illustrated in Fig. 1, both the force of spring 83 and the weight of mass 96 tend to swing lever 86 in a counterclockwise direction about pivot 87 and to swing mass 96 and shutter hook 72 in a clockwise direction about the axis of pivot shaft 94, yieldingly urging speed shutter 70 toward closed position (Fig. 1). As the film moving mechanism and shaft 78 are put into operation, centrifugal action of weights 79 tends to swing lever 86 clockwise in opposition to spring 83, applying, via link 92, a counterclockwise torque to crank arm 93, but with a low mechanical advantage because of the small angle between link 92 and the radial direction of crank arm 93. That angle is defined by contact of link 92 with pivot shaft 94, which contact also acts as a stop for the pivot shaft rotation. The resulting torque is at first insufficient to overcome the weight of mass 96. When the projector mechanism attains a critical speed close to its normal operating speed, the centrifugal force predominates, and mass 96 is swung upward around pivot shaft 94. As that movement starts, the angle between link 92 and crank arm 93 increases, increasing the mechanical advantage of the linkage, and hence accelerating the movement. Mass 96 is therefore lifted very quickly once the critical speed is reached. The result is that shutter 70 is opened with a snap action to its full open position (Fig. 8) once a safe operating speed is attained, and without any possibility that the shutter will open partially at lower speeds. Similarly, when the machine is slowed down, whether intentionally or because of some abnormal condition, the speed shutter is at first held open by governor 76, due to the relatively high mechanical advantage of linkage 92, 93; but once mass 96 begins to drop, closing the shutter, that mechanical advantage rapidly decreases, accelerating the action and cutting off the light from aperture 20 sharply and completely as soon as the speed drops to substantially the same critical speed at which the shutter opened.

As thus far illustratively described in detail, the two fire shutters are entirely independent in their operation. Speed shutter 70 is automatically opened by governor 76 as the film moving mechanism approaches normal operating speed, and is closed when the speed drops appreciably below normal speed. Film shutter 50 is held open under all normal conditions by latch hook 55, and is dropped to closed position when tripping arm 60 is lifted, as by abnormal expansion of film loop 18. That type of operation is satisfactory in many respects, but has the disadvantage that during the process of threading a film through the film moving mechanism the operator is apt accidentally to lift arm 60, at least momentarily, with his hand. That releases film shutter 50, which drops closed and must therefore be restored to open position before projection can be started. The operation of opening shutter 50 manually is extremely simple, and is not objectionable in itself. However, there is a possibility that the operator might forget that he had tripped the film shutter, and attempt to put the machine into operation with the film shutter still closed. That possibility is avoided, and operation of the machine is made more convenient and reliable, according to the present invention, by preventing the film shutter from becoming effectively tripped during the threading operation. That is accomplished by providing an interconnection between the speed shutter mechanism and the film shutter mechanism by which the film shutter cannot be effectively tripped so long as the speed shutter is closed. Since during threading, the machine is necessarily at rest with the speed shutter closed, that arrangement effectively prevents accidental tripping of the film shutter during threading.

A preferred mechanism for providing an interconnection of the type just described is illustrated in the drawings and is typical of the numerous equivalent devices for accomplishing the same object that will occur to those skilled in the art.

A latch 100 is actuated by governor 76 in synchronism with the operation of speed shutter 70. At speeds of the film moving mechanism for which speed shutter 70 is closed, latch 100 is so positioned that a latch lug 102 of the latch engages an aperture 104 in film shutter 50. That engagement is such as to prevent shutter 50 from dropping upon release of latch hook 55; and preferably actually lifts shutter 50 free of latch hook 55, as indicated for example in Fig. 2, where the upper edge of aperture 53 is seen to be spaced above the upper surface of latch hook 55. When the projector is operating at normal speed, with speed shutter 70 open (Fig. 4), the latch lug 102 of latch 100 is withdrawn from shutter aperture 104, permitting shutter 50 to drop until it is supported and controlled only by latch hook 55.

In the embodiment illustrated, latch 100 is in the form of a flat plate, pivoted at 106 and lying in a radial locating slot 107 in mass 96, and restricted as to rotation about that pivot by sliding pivotal engagement of an open slot 108 in the plate with stud 58 in frame member 24. The movement of latch 100 is effectively confined to its own plane by the faces of slot 107, in which it fits freely, and, at stud 58, by guiding action of sleeve 59 at its inner face and of tripping arm 60 at its outer face (Fig. 2). Arm 60, in turn, is confined between latch plate 100 and the head of stud 58. When the speed shutter is closed, pivot 106 is located above and to the right of pivot shaft 94, as seen in Figs. 1 and 6–8, with latch lug 102 supporting film shutter 50. As the speed shutter opens, pivot 106 swings about pivot shaft 94 in a counterclockwise direction, causing latch plate 100 to pivot clockwise about stud 58, and at the same time causing slot 108 in the plate to move in translation to the left (as seen in Figs. 1, and 6–8). Slot 108 comprises two mutually oblique sections 109 and 110. As mass 96 starts to swing upward from the position of Fig. 1, the first movement of pivot 106 is upward and to the left. The upward movement of pivot 106 swings latch 100 clockwise about stud 58, and that swinging action is increased by the translative movement of the oblique slot portion 109 on the stud, causing depression of that end of the latch. Those two effects combine to produce an initial rapid clockwise rotation of latch 100, withdrawing latch lug 102 from aperture 104 in the film shutter. That shutter is thus returned to exclusive control by film actuated latch hook 55 almost immediately after speed shutter 70 has begun to move, and before it has opened appreciably (Fig. 7). During the latter part of the shutter-opening motion of mass 96, the outer portion 110 of slot 108 engages stud 58. That slot portion is approximately parallel to the direction of the corresponding, generally horizontal motion of pivot 106, so that latch plate 100 moves essentially in translation in that direction, in contrast to its predominantly rotary motion during the first stage of the operation.

When the projection machine is again slowed down or stopped, latch plate 100 is first moved primarily in translation to the right as seen in Fig. 8 until stud 58 engages inner oblique slot portion 109; and then is moved in translation combined with counterclockwise rotation about pivot 106. Latch portion 102 is thus first moved up to the vicinity of film shutter 50, and then thrust rapidly into aperture 104 as speed shutter 70 becomes fully closed. The upper, slanting face of latch lug 102 preferably engages the upper edge of aperture 104 before completion of that movement, and lifts the shutter by cam action free of latch hook 55.

An advantage of thus lifting shutter 50 free of its normal film controlled mechanism when speed shutter 70 is closed is that if latch hook 55 is then accidentally withdrawn from aperture 53 (as by momentary lifting of tripping arm 60), shutter 50 cannot drop enough to prevent ready re-engagement of the latch hook as soon as the tripping lever is released.

If film shutter 50 is tripped and drops to closed position during machine operation, as by an abnormal film condition, and the machine is then stopped, latch 100 is of course moved under governor control into the position shown, for example, in Fig. 1, except that film shutter 50 is then at the lower end of its travel in guideway 37. Latch lug 102 of the latch plate then projects through the plane of shutter 50 above the body portion of the shutter and at the right (as seen in Fig. 2) of shutter stem 52. Under that condition, there is no difficulty in manually lifting shutter 50 to open position. When shutter 50, being lifted, strikes the lower slanting face of latch lug 102, the latch is pushed with a camming action upward and to the left (in Fig 1), swinging mass 96 yieldingly counterclockwise around its pivot shaft just far enough to let shutter 50 pass by the latch lug. A lip formation on shutter 50 above aperture 104, indicated at 114, assists that camming action. During this forced movement of the latch and mass 96, the mechanical advantage of the connected crank arm 93 over governor spring 83 is very large, so that the spring opposition to the movement is negligible. When aperture 104 of shutter 50 comes opposite the tip of latch lug 102, the latter enters under the force of the weight of mass 96. That force is great enough to then insure lifting shutter 50 to the position shown in Figs. 1 and 2, so that latch hook 55 cannot fail to properly engage aperture 53. The yielding action of the latch lug 102, resulting, as just described, from yielding movement of the entire mass 96, may alternatively be provided, for example, by mounting latch lug 102 yieldingly on latch plate 100. The latch lug is then preferably maintained by suitable resilient means in effectively fixed relation to latch plate 100 (for example in the relation illustrated) under normal operating conditions; but is shiftable from that position radially inwardly on the plate in opposition to the resilient means under the relatively strong camming force of manually lifted shutter 50.

In the preferred embodiment illustrated, mass 96 is arranged to perform a number of distinct and useful functions. As already described, it acts as a crank arm in supporting shutter hook 72. A generally radial surface 116 is provided in the lower part of the mass to facilitate connection of hook 72 by means of screws 117 (Fig. 6, for example). Mass 96 has an inner, generally cylindrical hub portion 118 which is provided with a radial slot 119 (Figs. 4 and 13), open at the inner face of the hub and adapted to engage a transverse pin 120 fixed in pivot shaft 94, and thereby to define both the rotational and axial positions of the mass on the shaft. A retaining screw 122, threaded axially into the outer end of the pivot shaft locks mass 96 in position, and provides convenient disassembly. The outer portion of mass 96 includes a circular sector 124, as clearly shown in Fig. 1, the mass of which is eccentrically related to the pivot axis for the purpose already described. The outer periphery 125 of sector portion 124 is of such a radius that it is normally tangent to stem 52 of film shutter 50, and thus acts as a shutter guide, supplementing guideway 37. Since surface 125 is circular about the axis of pivot shaft 94, that guiding action is independent of the rotational position of mass 96. The opposite face of shutter 50 is similarly guided by stud 58 (or by the levers which it carries). Outer periphery 125 forms a relatively narrow flange inside of which is an inner peripheral surface 126 of smaller radius, so chosen that the surface is normally tangent to stem 75 of speed shutter 70 and acts as a guide for that shutter. The two shutter stems 52 and 75 overlap somewhat, as shown in Fig. 2, so that each shutter blade tends to guide the other over substantially their full vertical length. The radial surface 116 to which shutter hook 72 is attached, cuts into the lower portion of inner peripheral surface 126, but leaves enough of the latter to overlap shutter stem 75 and insure guidance of the shutter even when mass 96 is in its elevated position (Fig. 8). Axially inwardly of radial surface 116, the upper portion of mass 96 is slotted at 107, as already described, to receive and guide latch 100. Latch pivot 106 is mounted in a bore that extends across that slot.

The improved dowser shutter mechanism will now be described. It provides the novel feature of two opposing shutter blades, movable vertically in translation, so that the light beam is cut off symmetrically and sharply. Those shutter blades slide in direct facial contact with each other in guideway 36, and are operated by means of a simple and effective rack and pinion arrangement. Forward dowser shutter blade 150 is a flat plate with a light aperture of which the lower edge 152 is spaced rather widely from the lower edge of the plate; and with an upwardly extending stem 154, one vertical edge of which is folded rearwardly out of the plane of the shutter blade and serrated to form a toothed rack 156. Rear dowser shutter blade 160 is a somewhat similar plate, but having a light aperture of which the lower edge 162 is relatively close to the bottom edge of the blade and the upper defining edge is well spaced from the upper blade edge. Blade 160 is provided with an upwardly extending stem 164 which is offset back from the plane of the shutter, as seen clearly in Figs. 6 and 11, by means of transverse section 165 of the stem. Stem 164 has one edge bent forwardly out of its plane and provided with rack teeth 166 which oppose the teeth 156 of shutter blade 150 in spaced relation.

Between those sets of rack teeth 156 and 166, and engaging both of them, is mounted a pinion 170. Pinion 170 is freely rotatable on a spindle 172 within a well 174 formed in horizontal flange 32 of frame 24 (Figs. 8 and 9). Spindle 172 is secured in a horizontal bore in the flange, as by screw threads in its enlarged head portion 173. When the mechanism is mounted in the projector, spindle 170 is further locked in its bore by the adjacent wall 16 of the projector case. The two shutter stems pass through well 174 and are slidingly retained by its side walls in engagement with pinion 170, as shown clearly in Fig. 9. The lower portion of the rear wall of well 174 may be beveled at 175 (Fig. 8) to facilitate disassembly of rear dowser blade 160, and to accommodate a reinforcing flange 176 on the shutter stem 164.

Pinion 170 is driven, to actuate the dowser shutter blades, by a toothed sector 180 which is pivoted on a headed stud 182 mounted on frame plate 25 of frame 24. As sector 180 swings about its pivot, its rack teeth 181 drive pinion 170 and thereby raise one shutter blade and lower the other. Sector 180 may itself be driven in any convenient manner. A connecting link 186 is indicated in the drawings, pivoted eccentrically on the sector at 187 and adapted to drive it by reciprocating motion, produced, for example, by an electric solenoid under switch control, not shown. Sector 180 also carries an upwardly extending handle 190, which projects through a slot 192 in the roof 21 of the projector case, where it is readily operable manually from outside the case. Handle 190 lies in a plane parallel to, but spaced from, sector 180 proper, to which it is rigidly joined by transverse portion 193, and is pivoted like sector 180 on stud 182. That construction provides two bearing supports for the sector and handle unit on pivot stud 182.

The travel of the two dowser shutter blades 150 and 160 in guideway 36 is conveniently limited by alternate contact of the upper edges of their main portions with the lower face of frame flange 32. The parts are preferably so proportioned that each blade travels a little more than half the vertical dimension of the aperture to be closed. In open position, apertures in the respective shutter blades register with each other and with aperture 46 in front cover plate 44. To close the shutter, pinion 170 is turned counter-clockwise (as seen, for example, in Fig. 6) to raise blade 150 and lower blade 160. The lower half of the light beam is then cut off by the solid portion of shutter blade 150 that lies below its aperture; and the upper portion of the light beam is cut off by the solid portion of shutter blade 160 that lies immediately above its aperture.

It will be seen from the above description that the preferred modification of the invention leads to a very simple and compact arrangement whereby both dowser shutter and fire shutter are incorporated in a unitary structure. Among the outstanding advantages of that improved structure is the remarkable ease with which the parts can be disassembled as for cleaning or for other types of maintenance. Removal of the three bolts 35 and disconnection of dowser actuated rod 186 at either end permit frame 24 and all parts of the shutter assembly mounted thereon to be removed bodily from the projector case, leaving mass 96 and latch 100 in position on pivot shaft 94. It will be seen that slot 74 in shutter stem 75 slips outwardly free of shutter hook 72 on mass 96 before striking outer flange 125 of the mass; and stud 58 slips out of the end of open slot 108 in latch 100. It is ordinarily more convenient to follow the alternative procedure of initially removing also retaining screw 122 from the outer end of pivot shaft 94, releasing mass 96 for axial removal from the shaft. Mass 96, frame 24 and all of their carried mechanism are then removable together from the projector case in substantially their normal relative positions. Those two principal units are then readily separable from each other.

With the assembly thus removed from the projector case, fire shutters 50 and 70 can be lifted directly from their guideway 37, sector rack 100 being first swung back out of the way. Full access to both guideways 36 and 37 is gained merely by removing the two screws 42 and slipping cover piece 40 downward until it is free of frame 24. Dowser shutter blades 150 and 160 are then removable together with pinion 170 as soon as pinion spindle 172 is removed from the back of frame 24. Procedure for disassembly of the remaining parts of the shutter mechanism, and for its reassembly, will be obvious from the drawings and from the description already given.

In the preferred modification illustratively described above, the interconnection between the control mechanism of speed shutter 70 and the film shutter 50 is actuated directly from an element of the speed shutter control linkage (mass 96), and acts directly upon film shutter 50 itself (via latch lug 102). It will be understood that an interconnection between the shutters, acting in response to closure of the speed shutter to prevent closure of the film shutter, may be provided in other ways, and may exercise its control over the film shutter less directly. For example the intershutter control means may be actuated by a different element of the speed shutter control mechanism, or even by a separate speed responsive means, distinct from governor 76, but driven in timed relation to the film moving mechanism; and may act upon some part of the film shutter control mechanism rather than upon the film shutter itself.

Figures 15 and 16 represent an illustrative arrangement of the latter type. Latch 100 of the preferred modification is here replaced by a flat locking member 200, mounted and actuated in somewhat the same manner. Locking member 200 is pivoted at 206 in a radial slot in mass 196, which corresponds to mass 96 of the preferred form but has an upward extension which permits pivot 206 to be positioned, as illustrated, above or to the left of pivot shaft 58 when the mass is in its lower position (Fig. 15), with speed shutter 70 closed. Member 200 is provided with a slot 208 which extends obliquely downward to the right and engages pivot stud 58 in the general manner already described. That stud carries a latch hook 55 on arm 56, adapted to normally support film shutter blade 50 in open position, and tripping arm 60 adapted, as before, to release the latch hook and drop the shutter in response to lifting of the arm, as by the film.

Lock member 200 carries a locking lug 202 at its forward end, that lug being bent outwardly from the plane of member 200 and extending above tripping arm 60. The level of locking lug 202 is so determined that it firmly contacts the upper surface of arm 60 when mass 196 is in its lower position (with speed shutter 70 closed) and latch hook 55 is in shutter supporting position (Fig. 15). Arm 60 is then effectively locked against upward motion, and film shutter 50 therefore cannot be accidentally released. Closure of shutter 50 is thus prevented, not by providing a separate shutter support as in the preferred modification, but by preventing release of the film actuated shutter support.

As mass 196 is raised toward its upper position, opening speed shutter 70, pivot 206 moves at first approximately horizontally to the left in Fig. 15. The resulting translational movement of lock member 200 with respect to stud 58, combined with the oblique angle of slot 208, swings the forward end of the member upward and lifts locking lug 202 free of arm 60 (Fig. 16). Tripping arm 60 is thus returned to control by the film loop, abnormal expansion of which will lift the arm, releasing film shutter 50.

Latch arm 56, in the present modification, is preferably somewhat flexible, so that when latch hook 55 is riding on the forward face of shutter blade 50 (as when that shutter is closed) arm 60 does not positively prevent locking lug 202 from moving to the position shown in Fig. 15. Latch arm 56 can be sufficiently flexible for that purpose, and yet be effectively rigid under other conditions of operation.

The above described means for opening and closing shutter 70 in response to variations in speed of the film moving mechanism is broadly illustrative of a variety of shutter control means, responsive to conditions of the machine other than the position of the film. For example, a shutter may be operated in accordance with the speed of a separately driven blower that produces a cooling air stream over parts of the projector, or in accordance with the air pressure in such an air stream, as is common practice in some types of projector. Shutter 70 may be automatically controlled by thermal means responsive to temperature at some part of the machine, or may be a manual shutter. While the invention is particularly effective in its preferred illustrative embodiment, the scope of the invention is not intended to be limited by that embodiment, but is defined by the following claims.

I claim:

1. Fire shutter means for a motion picture projection machine of the type having a light source, a film aperture and a film moving mechanism for moving a film past the aperture; said fire shutter means including a first shutter positioned between the light source and the aperture and shiftable between open and closed conditions in response to variations in the speed of the film mechanism, a second shutter between the light source and the aperture, means yieldingly urging the second shutter toward closed position, first releasable holding means for the second shutter normally acting to lock that shutter in open position, said holding means being releasable in response to predetermined variations of film position, and second releasable holding means for the second shutter shiftable between a shutter locking position in which the shutter is locked open and a shutter releasing position, said second holding means being shiftable between shutter locking position and shutter releasing position in response to variations in the speed of the film moving mechanism.

2. Fire shutter means for a motion picture projection machine of the type having a light source, a film aperture and a film moving mechanism for moving a film past the aperture; said fire shutter means including two shutters between the light source and the film aperture, means tending to cause closure of one of the shutters in response to predetermined deviations of film position, speed responsive means driven in timed relation to the film moving mechanism and responsive to variations in the speed of that mechanism, a first linkage connected between the speed responsive mechanism and the second shutter and acting to cause closure of that shutter when the said speed is less than a predetermined value, and a second linkage connected between the speed responsive mechanism and the first shutter and acting to lock that shutter open when the said speed is less than a predetermined value.

3. Fire shutter means for a motion picture projection machine of the type having a light source, a film aperture and a film moving mechanism for moving a film past the aperture; said fire shutter means including a massive element eccentrically pivoted on a horizontal axis for swinging motion between an upper and a lower position, speed responsive means driven in timed relation to the film moving mechanism and responsive to variations in the speed of that mechanism, said speed responsive means acting to overcome the weight of and to swing the said element to its upper position at mechanism speeds greater than a predetermined value, two shutters between the light source and the film aperture, means tending to cause closure of one of the shutters in response to predetermined deviations of film position, the second shutter being operatively connected to the massive element to be opened when the element is in its upper position and to be closed when the element is in its lower position, and means operatively connected to the massive element and acting to lock the said one shutter open when the element is below a predetermined position.

4. Fire shutter mechanism as defined in claim 3, and in which the said predetermined position of the said massive element is spaced from, but relatively close to, its said lower position.

5. Fire shutter mechanism as defined in claim 3, and in which the last-mentioned means comprises a latch engageable with the said one shutter by virtue of swinging movement of the said massive element to its said lower position, and releasable from that shutter by virtue of swinging movement of the element through a relatively small angle from its said lower position toward its said upper position.

6. Fire shutter means as defined in claim 3, and including also a radial slot in the said massive element, a latch carrying a latch lug and guided by the slot to move in a plane normal to the axis of rotation of the element, the position of the latch in the plane of the slot being defined by a pivot and a sliding pivot, one of those pivots being mounted on the said massive element and the other pivot being fixed, the latch lug being movable with the latch to engage the said one shutter and lock it in open position as the massive element moves toward its lower position.

7. Fire shutter means for a motion picture projection machine of the type having a light source, a film aperture and a film moving mechanism for moving a film past the aperture; said fire shutter means including a first shutter positioned between the light source and the aperture and shiftable from open to closed condition solely in response to variations in the speed of the film moving mechanism, a second shutter positioned between the light source and the aperture, first holding means acting normally to hold said second shutter in open position, said holding means being actuatable to cause closure of said second shutter solely by varitions of film position, and second holding means for holding said second shutter in open position, said second holding means being actuatable respectively into and out of shutter holding condition under control of the movement of the first shutter into and out of closed position.

8. Fire shutter means for a motion picture projection machine of the type having a light source, a film aperture and a film moving mechanism for moving a film past the aperture at a normal operating speed; said fire shutter means including a first shutter positioned between the light source and the aperture and shiftable from open to closed condition solely by virtue of the speed of the film moving mechanism falling appreciably below that of the said normal operating speed, a second shutter positioned between the light source and the aperture, control means for the second shutter acting normally to hold that shutter in open condition, said control means being actuatable to cause closure of the second shutter solely by variations of film position, and means responsive to the speed of the film moving mechanism and acting to disable the said shutter-closing actuation of the control means by virtue of the mechanism speed falling appreciably below the said normal operating speed.

9. Fire shutter means for a motion picture projection machine of the type having a light source, a film aperture and a film moving mechanism for moving a film past the aperture at a normal operating speed; said fire shutter means including a shutter positioned between the light source and the film aperture, a movable element having a normal position and movable from that normal position in response to predetermined deviations of film position, control means for the shutter acting under control of the movable element to hold the shutter open when the element is in normal position and to cause closure of the shutter by virtue of the said movement of the element from normal position, blocking means for the said movable element shiftable between a blocking condition in which that element is locked in its normal position and an idle condition in which that element is released for its said movement, and control means for the blocking means responsive to the speed of the film moving mechanism and acting to shift the blocking means to idle condition when that mechanism is operating at the said normal speed, and to shift the blocking means to blocking condition when that mechanism is operating at substantially less than normal speed.

EMANUEL C. MANDERFELD.

REFERENCES CITED

The following references are of record in the file of this patent:

UNITED STATES PATENTS

| Number | Name | Date |
|---|---|---|
| 1,384,947 | Geyer | July 19, 1921 |
| 1,439,091 | Geyer et al. | Dec. 19, 1922 |
| 1,985,629 | Crabtree | Dec. 25, 1934 |